US009864051B2

(12) United States Patent
Nielsen

(10) Patent No.: US 9,864,051 B2
(45) Date of Patent: Jan. 9, 2018

(54) METHOD OF ESTIMATING A LOCAL PLOT DENSITY IN A RADAR SYSTEM; A PLOT DENSITY ESTIMATOR AND A RADAR SYSTEM WITH A PLOT DENSITY ESTIMATOR

(71) Applicant: Terma A/S, Lystrup (DK)

(72) Inventor: Esben Nielsen, Lystrup (DK)

(73) Assignee: Terma A/S (DE)

( * ) Notice: Subject to any disclaimer, the term of this patent is extended or adjusted under 35 U.S.C. 154(b) by 271 days.

(21) Appl. No.: 14/441,156

(22) PCT Filed: Nov. 5, 2013

(86) PCT No.: PCT/EP2013/073043
§ 371 (c)(1),
(2) Date: May 6, 2015

(87) PCT Pub. No.: WO2014/072285
PCT Pub. Date: May 15, 2014

(65) Prior Publication Data
US 2015/0301170 A1    Oct. 22, 2015

(30) Foreign Application Priority Data
Nov. 7, 2012    (EP) .................................... 12191629

(51) Int. Cl.
*G01S 13/524*    (2006.01)
*G01S 7/292*     (2006.01)
*G01S 13/72*     (2006.01)

(52) U.S. Cl.
CPC ............ *G01S 13/524* (2013.01); *G01S 7/292* (2013.01); *G01S 13/5248* (2013.01); *G01S 13/72* (2013.01)

(58) Field of Classification Search
CPC .... G01S 13/524; G01S 13/5248; G01S 13/72; G01S 7/292
USPC ......................................................... 342/160
See application file for complete search history.

(56) References Cited

U.S. PATENT DOCUMENTS

| 4,992,795 A | 2/1991 | Lassallette |
| 2014/0347208 A1* | 11/2014 | Schoor .................... G01S 7/354 |
| | | 342/133 |

FOREIGN PATENT DOCUMENTS

| DE | 102 38 896 | 3/2004 |
| EP | 2 386 874 | 11/2011 |

OTHER PUBLICATIONS

Reed, C.M., "Bayesian Track and Plot Management" in IEE Colloquium. Target Tracking: Algorithms and Applications, Nov. 11-12, 1999, pp. 8/1-8/6.

* cited by examiner

*Primary Examiner* — Timothy A Brainard
(74) *Attorney, Agent, or Firm* — Knobbe, Martens, Olson & Bear, LLP

(57) ABSTRACT

A method of estimating a local plot density in a radar system observing an observation volume, the radar system configured to generate plots with plot attributes, by establishing a non-empty set of M-dimensional basis functions and corresponding coefficients, and repeatedly updating at least one coefficient based on at least one plot as obtained from the radar system, adjusting the basis functions and corresponding coefficients to represent a number of plots in a predetermined adjusting interval, and estimating the local plot density at a given point in the observation volume.

19 Claims, 13 Drawing Sheets

METHOD OF ESTIMATING A LOCAL PLOT DENSITY IN A RADAR SYSTEM; A PLOT DENSITY ESTIMATOR AND A RADAR SYSTEM WITH A PLOT DENSITY ESTIMATOR

SUMMARY

This invention relates to method of estimating a local plot density in a radar system; a plot density estimator and a radar system with a plot density estimator.

In particular this invention relates to a method of estimating a local plot density in a radar system observing an observation volume and configured to generate plots with plot attributes, where the method comprises:
establishing a non-empty set of M-dimensional basis functions and corresponding coefficients; hereinafter repeatedly
updating at least one coefficient based on at least one plot as obtained from the radar system;
adjusting the basis functions and corresponding coefficients to represent a number of plots in a predetermined adjusting interval
estimating the local plot density at a given point in the observation volume.

BACKGROUND OF THE INVENTION

Radars in general provides a lot of potential target detections, called plots, some are false and some are true detections of real targets.

Patent application EP 2 386 874 (BAE Systems PLC) disclose a method of estimating a plot density in a radar system.

It is an object of this invention to provide a method and implementation that will improve tracking of targets as well as discarding plots unlikely to represent real targets.

Improvements over the prior art that are more reliable, faster, simpler, and more robust as well as other such measures relevant in radar performance will be advantageous.

In one aspect improved estimates of plot density can achieve this.

In other aspects reliable or robust schemes for estimating a plot density are desirable.

In yet other aspects simple schemes or sub-schemes for estimating a plot density are desirable.

In at least one aspect the disclosure in EP 2 386 874 may be improved. According this prior art, the plot density as a threshold for splitting of basis functions will lead to a recursive and splitting of sub-cells or basis functions representing the largest clutter density or local plot density in areas with clutter density over the threshold. The statistical uncertainty in these recursively divided cells has been found not find a good balance between the statistical uncertainty in the local plot density estimate and the resolution of the map.

DESCRIPTION

This is achieved by a method of estimating a local plot density in a radar system observing an observation volume and configured to generate plots with plot attributes; the method comprising:
establishing a set of basis functions spanning a M-dimensional measurement space and corresponding coefficients to represent the local plot density; hereinafter repeatedly
updating at least one coefficient based on at least one plot as obtained from the radar system;
adjusting the basis functions and corresponding coefficients to represent a number of plots in a predetermined adjusting interval;
estimating the local plot density, which can be at any given point representing the observation volume.

To exit the adjusting a condition is obviously needed. One such condition could be when the basis functions extend or minimal size, typically a given resolution in the radar system.

The method can be used in a radar system with a radar that works by transmitting a signal such as radio or microwave signal and listens to the echoes scattered off various objects in the observation volume of the radar.

This adjustment of basis functions and coefficients in thus based on keeping the number of plots in a predetermined interval contrary to adjusting the basis functions based on the plot density associated with each basis function. An effect of this difference is to adaptively control the statistical uncertainty of the local plot density within acceptable bounds and thus to obtain the best possible at least a better resolution in the local plot density than known hitherto.

The radar system can be equipped with a plot extractor, which analyses the output of the radar and identifies peaks in the radar return signal—typically after some signal pre-processing—as plots which is interpreted as potential observations of targets.

In many cases the number of false plots coming from noise or unwanted returns from waves, land or other real, but uninteresting objects, which combined are called clutter, is much higher than the number of plots originating from the targets that the user is really interested in.

Typically, a radar plot, p, has a set of attributes $z_p$, features or measures. These attributes can be range and bearing relative to the radar site, but plot features such as intensity, as the intensity of the echo from the radar, and radial (Doppler) velocity are also common.

The set of used plot attributes constitutes a measurement space and the number of attributes used determines the dimension (M) of the measurement space.

A subspace can be a spatial space that can be 1D, 2D, or 3D and can be with temporal dependencies. The coordinate representation of a 3D-spatial space can be 2D-Cartesian with a $3^{rd}$ elevation or equivalent.

A subspace also, and importantly, comprises dimensions based on intensity measures.

For effective tracking it is important to know the false plot density of plots, D(z). The unit of this number is the inverse of the combined units of the measurement space. For instance, if the measurement space consists of range and bearing, the unit of the density would be $m^{-1}$ $rad^{-1}$ when SI units are chosen. Other measures can be established based on the plot attributes and their units will be used.

Furthermore, the method can be applied in a radar system with a tracker that is configured to combine plots into tracks of supposedly real targets.

In radar contexts as outlined, or equivalent contexts, the method and variants of the method is advantageous. Furthermore, a person skilled in the art will be inclined to adjust, modify, or adapt physical equipment to produced data in a required format to make use of the method. Likewise, the person skilled in the art will be inclined to adjust, modify or adapt the method as required to implement the method in existing radar equipment.

It is in such a context that a non-empty set of M-dimensional basis functions and corresponding coefficients are established.

In general the clutter or plot density can be expanded on a set of basis functions. I.e. the density at a given point is given by $$D(z)=\Sigma a_i e_i(z), \quad [1]$$

where ei, i=1, 2, . . . M, is a set of basis functions in a M-dimensional space.

When normalized, that is $$\int e_i dV = 1, \quad [2]$$

then $a_i$ is simply counting the number of plots represented by basic function $e_i$.

According to an embodiment the basis functions are localized to minimize the couplings between coefficients to limit the computational load.

When adding a new plot, p, the change to the coefficients can approximately be calculated as $$\Delta a_i = e_i(z_p)/(\Sigma_j e_j(z_p)) \quad [3]$$

and the reverse when a plot is removed.

In a particular implementation a cell corresponds to one basis function being $V_c^{-1}$ in the cell and 0 outside, and implicitly the $a_i$ is calculated like above, since $e_i(z_p)/(\Sigma_j e_j(z_p))=1$ in that case.

Estimating the plot density at any given point in the measurement space surrounded by a cell with a volume $V_c$ can for example be done by using $$D(z_p) = c(n_c + s\operatorname{sqrt}(n_c+1))/(V_c S(p,p_o)) \quad [4]$$

where $n_c$ is the number of the plots within the cell and $V_c$ is the volume of the cell and measured in for instance m rad. sqrt($n_c$+1) is the statistical uncertainty of the number of plots in the cell.

c and s are parameter constants chosen to make the estimate as conservative as needed.

One selection would be c=1 and s=0 for which $D(z_p)$ is the maximum likelihood estimate:

$$D(z_p) = n_c/(V_b S(p,p_o)) \quad [5]$$

$S(p, p_o)$ is the difference in scans as measured in number of scans between the newly arrived plot p and the oldest considered plot $p_o$.

The method starts out by having one cell covering the whole measurement space.

For a rotating radar, $S(p, p_o)$ can be calculated as the total amount the antenna have rotated from one plot to the other calculated in radians divided by $2\pi$.

For a non-rotating radar, the number of frames, or simply the time difference between the plots divided by a typical revisiting time, can be used.

Adjusting, i.e. to split and merge, the cells according to the number of plots within the boxes will keep the statistical uncertainty sqrt($n_c$+1) within acceptable bounds, and reliable plot densities can be obtained.

Another advantage of partitioning the space to maintain a desirable number of plots in each partitioned cell as compared to just splitting and merging on the basis of, say, an estimated plot density is that undesirable defects are eliminated or reduced.

For example, splitting a cell once the plot density is too high or if a cell has a clutter density over a limit will result in that the clutter density in at least one of the two sub-boxes is also over the same limit. This will result in a new cell that would have to be split as well, etc. This process will continue until a cell reaches the minimum size.

To avoid false tracks, the coefficients c>1 and s>0 could be chosen. It has been found that using c from 1 to 10 and s=0-3 are working parameter ranges.

c>1 is useful to compensate for the clutter not being uniformly distributed inside a cell.

Furthermore, having s>0 avoids a zero clutter estimate when the number of plots in a cell is $n_c$=0.

According to a further aspect of the invention, the method is advantageous when adjusting the basis functions, and adjusting or modifying the corresponding coefficients comprises a step of splitting the basis functions and corresponding coefficients.

It is understood that splitting is performed to partition the measurement space in such a way as to obtain or maintain a certain number, or stay within an interval, of plots in each partition or cell.

Thus the process of splitting provides a way of partitioning the space.

According to a further aspect of the invention, the method is advantageous wherein adjusting the basis functions and corresponding coefficients comprises a step of updating at least one coefficient when a plot is removed.

According to a further aspect of the invention, the method is advantageous wherein adjusting the basis functions and corresponding coefficients comprises a step of joining basis functions and modifying the corresponding coefficients.

In an implementation, this step is performed to maintain a predetermined number of plots or to maintain a number of plots per basis function within a certain interval.

According to a further aspect of the invention, the method is advantageous wherein the basis functions are normalised.

Thus for example for a basis function $\int e_i dV = 1$, then the coefficient $a_i$ is simply counting the number of plots represented by basic function $e_i$.

A further advantage is that computational artefacts resulting from subtraction and addition is minimized and thus results in more reliable estimates.

According to a further aspect of the invention, the method is advantageous wherein the method further includes at least one step of adjusting the basis functions and corresponding coefficients based on a feedback of a track, t.

This is to remove the plots originating from true targets so the estimated plot density is closer to the false plot density. This is important in the case where real targets are closely spaced and when it no longer applies that the number of false plots is much higher than the number of true plots.

For effective tracking, it is important to know the false plot density of plots, D(z). The unit of this number is the inverse of the combined units of the measurement space. For instance, if the measurement space consists of range and bearing, the unit of the density would be m-1 rad-1 when SI units are chosen. When the intensity attribute is included, the unit is $m^{-1}$ $rad^{-1}$ $dB^{-1}$.

In a tracker, each potential track, t, can be predicted into the future. The result of this prediction is a probability density function l(z|t), which is the likelihood density for the target to generate a plot from the radar having the attributes z.

This has the same dimension as D(z) and it is measured per volume measurement space.

For each plot, p, the unit less ratio $l(z_p|t)/D(z_p)$ is important.

First, it is used as an association likelihood, which provides information to the tracker how likely this particular plot is to represent a specific target, t.

Second, the likelihood for a track representing a real target is multiplied with this number, when it is decided that the plot and track do associate. A track is typically declared real when the likelihood exceeds a certain limit.

Hence, if $D(z_p)$ is estimated too high, the likelihood for a track is not increased enough and tracks initialization is slower than needed.

Or in worst case $l(z_p|t)<D(z_p)$, such the track likelihood is decreasing, it is never declared real.

If $D(z_p)$, on the other hand, is estimated too small, the probability of plots from clutter/noise add up and create a false track, which is counted as a real increase. Thus the tracker will have a too high false track rate.

Thus, more accurate estimate of $D(z_p)$ is advantageous even in very non-homogenous scenarios.

Typically, there will be many false plots coming from clutter close to the radar installation, whereas at long distance the plots are true false alarms (noise).

In sea installations, abrupt changes in clutter conditions and narrow patches of clutter can occur due to local currents and variation in water depth, making it a challenge to estimate the local clutter density based on a fixed partition of measurement space alone.

According to a further aspect of the invention, the method is advantageous wherein the measurement space at least comprises one measure of intensity of an echo from the radar system.

In an embodiment, the intensity measure is combined with at least one spatial measure.

If the intensity is not included, the choice of extraction threshold directly influences the $D(z_p)$.

If the threshold is lower, more plots will be extracted and $D(z_p)$ will increase for all plots, including plots with high a intensity. I.e. $l(z_p|t)/D(z_p)$ will be lower and the tracker will not initialize real tracks as fast—or maybe not at all—even for targets having a high intensity. Therefore the radar and plot extractor have to be set up to yield a low plot density, which again leads to lower radar sensitivity.

Including intensity makes it possible to handle many low intensity plots while still initializing tracks on high intensity plots.

For low intensity plots close to the extraction threshold, $D(z_p)$ is simply higher than for plots with high intensity. The only limitation is the bandwidth and computational resources.

However, when the intensity dimension is included, the plot density is much more non-homogenous. Far from the radar, there will be a narrow band of white noise plots close to the plot extraction threshold, whereas closer to the radar there will be a span of clutter plots having a much broader spread in intensity.

The plot density, $D(z)$, can also be used in a plot discriminator without performing tracking: Let $f(z)$ be a known density function of wanted targets. If, for instance, the measurement space consists of range, azimuth and intensity this describes the density of targets according to position and intensity. Now in accordance to the Neyman-Pearson lemma comparing $f(z)/D(z)$ against a fixed threshold will provide the best discrimination of false and true plots.

According to a further aspect of the invention, the method is advantageous wherein the method comprises a further step of removing old plots.

In an embodiment, the removing of old plots is performed in order to maintain a predetermined number of plots based on a first-last-out memory of plots.

In a different embodiment, plots, $p_o$, are removed whenever on $S(p,p_o)>N$, p being the newest arriving plot. N is some number of scans.

This ensures a recent base of plots and reduces the computational complexity. It further allows for balancing the computational resources.

It is also important that $n_n \geq N$. If there is a real target present, it will over N scans generate N almost identical plots and thus result in at least a cell smaller than the uncertainty of the plot around the real target, thereby yielding a very high plot density for these plots. An effect of this is that a tracker cannot pick up the target.

It is understood that adjusting the basis functions and corresponding coefficients is performed using similar operations as disclosed, but generally the operation of splitting is replaced by the operation of merging or joining.

According to a further aspect of the invention, the method is advantageous wherein the method further includes at least one step of fading memory where the contribution from a plot is adjusted by a weight of the plot that decays over time.

Alternatively, when the step of fading memory is deriving, the coefficients from a weighted combination of plots with a weight that decays over time.

According to a further aspect of the invention, the method is advantageous wherein the fading memory weight decays exponentially. One such exponential decay can be as $\exp(-S(p,p_1)/S_0)$. Alternatively the decay can be reciprocally; such as $1/S(p,p_0)$ or $1/(S_0(1-S(p,p_0)/S_0))$.

These exponentially decaying weights are particularly easy to implement and provide an effective and working implementation.

A person skilled in the art will implement these weights to avoid computational errors such as singularities. This is performed by excluding certain values such as $S(p,p_0)=0$.

According to a further aspect of the invention, the method is advantageous wherein at least a sub-dimension of the basis functions is a cell with a finite value inside the cell and 0 (zero) outside.

A preferred value is $1/V_c$ inside the cell, where $V_c$ is the volume of the cell. Other non-unity normalisations can be used. Thereby the evaluation is simplified and in cases reduced to merely counting.

According to a further aspect of the invention, the method is advantageous wherein adjusting the cells and corresponding coefficients is performed by any of the following steps:
  adjusting cells and corresponding coefficients by cyclically alternating dimensions in which the cells are to be adjusted;
  adjusting cells and corresponding coefficients in the dimension yielding an average plot position that is most distant from a centre position;
  adjusting cells and corresponding coefficients in the dimension yielding an median plot position that is most distant from a centre position;
  adjusting cells and corresponding coefficients in the dimension yielding a plot maximum likelihood;
or any combination thereof.

When a cell with n plots is split into two cells each having $n_1$ and $n_2$ plots and volumes $V_1$ and $V_2$ the log likelihood according to a poison distribution can be estimated as:

$$\log L = -n + n_1 \log(n_1/V_1) + n_2 \log(n_2/V_2). \quad [6]$$

It is understood that the adjusting is splitting or joining/merging as disclosed.

As an example the splitting of a cell is performed cyclically between an X-axis and a Y-axis in a 2D-space. This is computationally simple and effective.

Where to split or join is determined based using a measure or a metric that can be based on a distance or likelihood measure.

According to a further aspect of the invention, the method is advantageous wherein adjusting of a cell and corresponding coefficients in a dimension performed at a position determined by any of the following metrics on at least one cell where the metric determines the centre position;
the metric determines the average plot position;
the metric determines the median plot position;
the metric determines the plot maximum likelihood position;
and any combination thereof.

Using the centre method is advantageous as it is simple to implement and deterministic with respect to performance. The complexity of inserting and removing plots is $O(\log_2$ of the total volume divided by the minimum cell volume).

Thus the centre method provides a fast and simple way of determining a plot density.

Using the median method ensures that there are equally many plots on each side. Assuming that the underlying distribution is not changing, this gives a better balance and average performance. The downside is when the distribution changes, there is a risk of ending up with an unbalanced tree.

Thus the median method provides a reliable and robust way of determining a plot density.

The average method provides a simple approximation to median method and is a compromise between centre and median splitting.

Using the maximum likelihood method is very good at finding the split between two different densities.

For instance, shadows from surrounding buildings, ships and landscape create distinctive sector in the radar picture with no surface clutter. The maximum likelihood method is good at finding bearings defining these sectors.

However, a downside can be when the distribution changes, which gives rise to a risk of ending up with an unbalanced tree.

Thereby alternative method steps are provided to the person skilled in the art to be applied to optimise for different purposes and in particular in different implementations.

If no preferred method is determined, then simple experimentation and calibration can be used to find the best suited method in a given implementation.

In a particular embodiment, the method is special in that each basis function represents a M-dimensional cell in the measurement space attaining a constant value within the cell and zero outside, and the set of basis functions are non-overlapping in the M-dimensional measurement space.

This particular embodiment is further implemented so that a single cell is split, when the corresponding single cell basis function coefficient represents a number of plots, which exceed a threshold number for splitting.

The splitting can be performed by splitting a single cell into two or more non-overlapping cells filling the same volume in measurement space as the single cell, and with two or more new basis function coefficients representing the same number of plots as the basis function coefficient for the single cell.

The splitting of a single cell can be performed by dividing the cell into two cells by an intersecting plane in the measurement space.

In a special case, the intersecting plane is perpendicular to one of the M axis in the measurement space and called the splitting axis.

The splitting of an axis is done cyclically alternating between the M dimensions in measurement space.

Splitting of an axis can be selected as the axis along where the average plot position is most distant from a centre position of the cell under consideration.

An alternative method is where the splitting axis is selected as the axis along where the median plot position is most distant from the centre position of the cell under consideration.

Yet an alternative method is where the splitting axis is selected as the axis along where the maximum likelihood splitting position is most distant from the centre position of the cell under consideration.

In a similar vein, and using similar metrics, cells can be merged or joined using the same, but opposite, principles.

An object of the invention is achieved by a plot density estimator comprising a computational unit configured to perform a method of estimating a local plot density according as disclosed herein.

An object of the invention is achieved by a radar system comprising a radar configured to communicate with a radar transceiver and a plot extractor;

a plot density estimator configured to receive plots from the plot extractor and configured as disclosed herein and further configured to at least output:

plot density estimates to a plot discriminator; preferably configured with output means to output usable plots to a user; and/or plots to a tracker; preferably configured with output means to output usable tracks to a user.

Thereby is provided a radar system that is configured to implement and perform the disclosed of the disclosed steps in the method.

BRIEF DESCRIPTION OF DRAWINGS

Embodiments of the invention will be described in the figures, whereon.

| Detailed Description | |
|---|---|
| Item Number | Feature |
| 1 | Radar system |
| 2 | Observation volume |

-continued

| Item Number | Feature |
| --- | --- |
| 3 | Objects |
| 4 | Target |
| 5 | False target, clutter |
| 10 | Radar antenna |
| 12 | Radar transceiver |
| 14 | Plot extractor |
| 15 | Plots |
| 16 | Plot density estimator |
| 17 | Plot density |
| 18 | Plot discriminator |
| 20 | Output means for plots to user |
| 22 | Tracker |
| 23 | Track |
| 24 | Output means for tracks to user |
| 26 | Tracker feedback |
| 100 | Method |
| 102 | Plot density, D(z) |
| 104 | Plot Attributes, $z_p$ |
| 106 | Plot density, |
| 108 | False plot density, D(z) |
| 110 | Measurement space |
| 112 | Volume of |
| 200 | Establishing |
| 202 | Basis function |
| 204 | Basis function coefficients/coefficients |
| 206 | M-dimensional |
| 210 | Updating |
| 212 | Cell/Box |
| 214 | Volume of Cell, $V_c$ |
| 220 | Adjusting |
| 222 | Number of plots in cell c, $n_c$ |
| 224 | Adjusting number |
| 226 | Adjusting interval |
| 228 | Splitting |
| 230 | Estimating |
| 240 | Removing |
| 242 | Old plot |
| 244 | Merging/Joining |
| 300 | Metric |
| 301 | Adjusting position |
| 302 | Centre Metric |
| 303 | Centre Plot Position |
| 304 | Average Metric |
| 305 | Average Plot Position |
| 306 | Median Metric |
| 307 | Median Plot Position |
| 308 | Maximum Likelihood Metric |
| 309 | Maximum Likelihood Position |
| 310 | Scan |
| 312 | Fading Memory |
| 320 | Target likelihood/Prediction, I(z|t) |
| 322 | Likelihood ratio, I(zp|t)/D($z_p$), |
| 400 | Finite Elements Functions |
| 402 | Mesh points |
| 404 | Boundaries |

Figure 1:
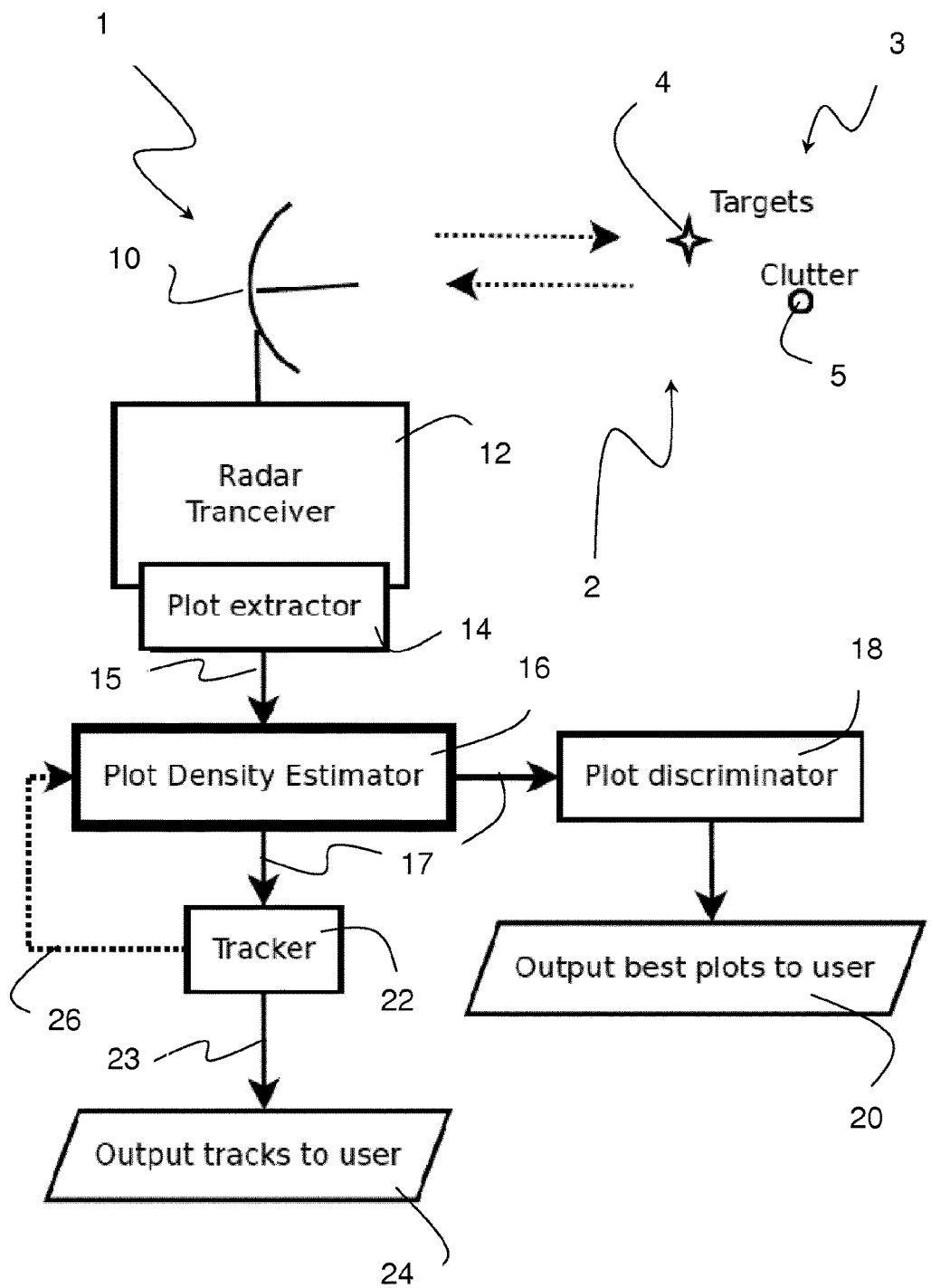
FIG. 1 shows an overview of an embodiment of a radar system with a plot density estimator.

FIG. 1 shows a schematic overview of a radar system 1 arranged to scan an observation volume 2 for objects 31, which objects 3 can be a target 4 or clutter 5, noise.

The radar system 1 comprises an radar antenna 10 connected to a radar transceiver 12 with a plot extractor 14, that can be embedded or peripheral, and configured to feed a stream of plots 15 to a plot density estimator 16.

In this embodiment, the plot density estimator 16 is further configured to feed plot density estimates 17, 17', . . . to a plot discriminator 18 with output means for plots to a user 20.

Optionally the plot density estimator 16 is further configured to augment a plot density estimate 17 to each plot 17, 17' and feed these augmented plots 17 to a plot discriminator 18 with output 20 of most likely target plots to a user by suppressing publication of plots with a plot density 17 exceeded a plot publication threshold.

Also in this embodiment the plot density estimator 16 is further configured to feed plot density estimates to a tracker 22 configured to feed tracks 23 to output means for tracks to a user 24.

In this embodiment there is also disclosed an optional tracker feedback 26 from the tracker 22 to the plot density estimator 16, which is further configured to utilise the tracker feedback for eliminating the true plots in the plot density 17.

Figure 2:
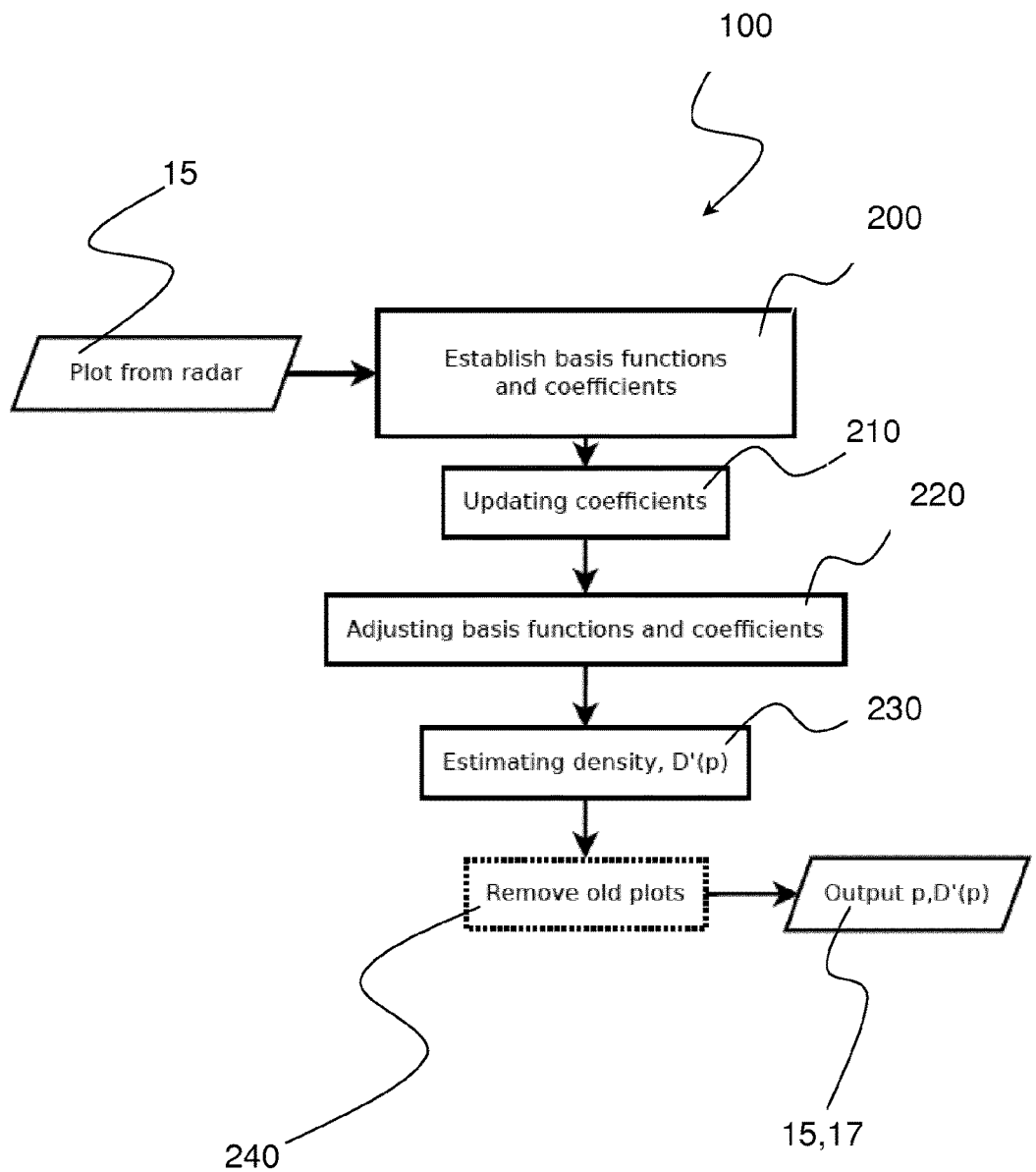
FIG. 2 shows a schematic overview of a method of estimating plot density.

FIG. 2 shows a method 100 of estimating a local plot density 17 in a plot density estimator 16 in a radar system 1. The method 100 comprises a step of establishing 200 a non-empty set of basis functions 202 and corresponding coefficients 204 in a M-dimensional measurement space 206; a step of updating coefficients 210; a step of adjusting 220 basis functions and/or coefficients; and estimating plot density 230. The method can comprise a further step of removing 240 old plots.

The method requires stream of plots 15 from a radar with an radar antenna 10 and generates a plot density 17; which in this embodiment is provided as an output along with the plot 15.

Figure 3:
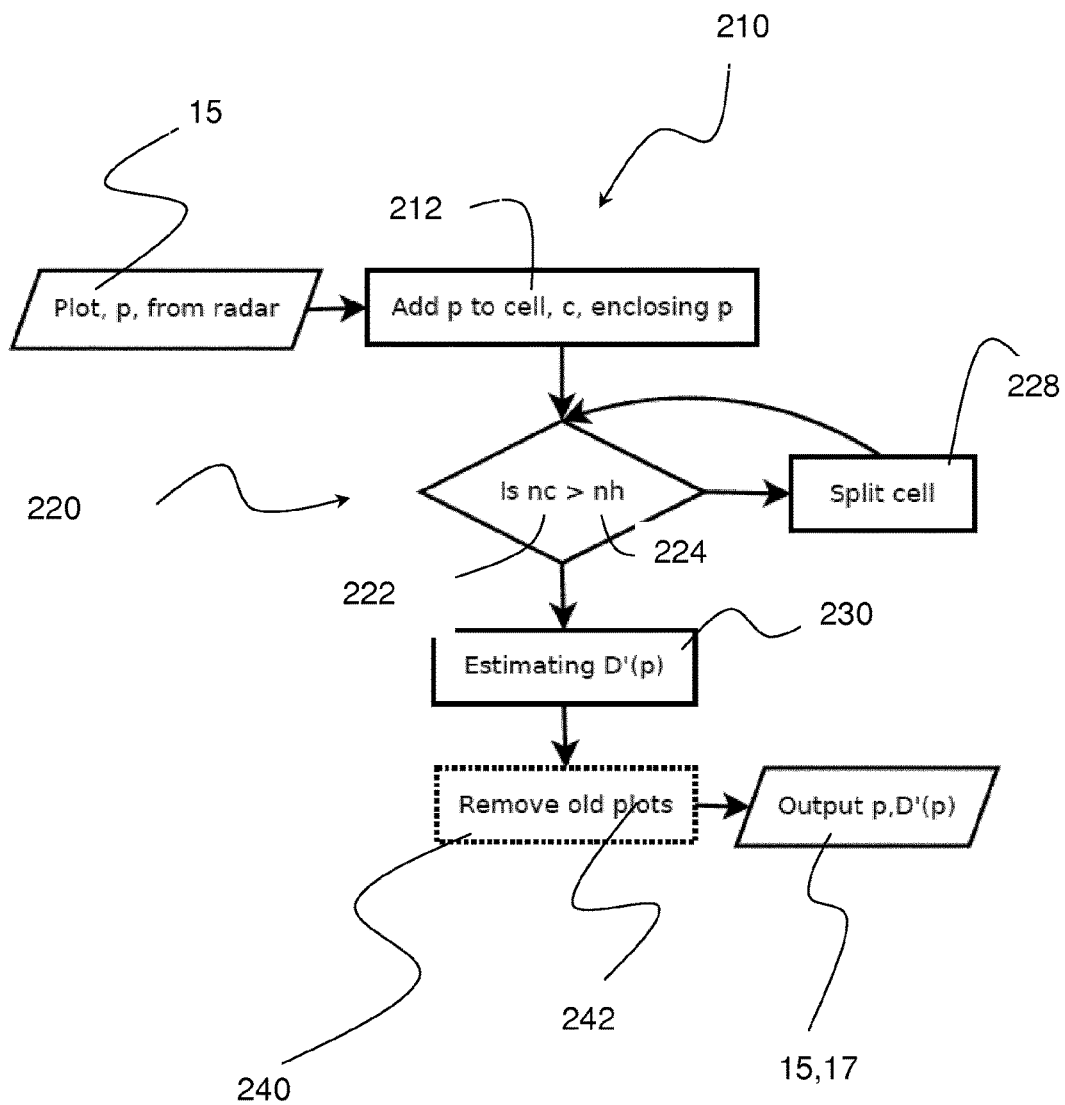
FIG. 3 shows a particular overview of a method of estimating plot density.

FIG. 3 shows a particular embodiment of the method 100 of estimating a local plot density 17.

The figure illustrates a case, where cells 212 are chosen as basis functions 202.

A plot 15, p is received from the radar system 1 with an antenna 10 and the plot 15, p is added to a cell 212 enclosing the plot 15, p. The cell 212 will be detailed later.

The step of adjusting 220 cells 212 and coefficients 204 is performed if the number of plots 222, nc, in a cell 212 is greater than a splitting threshold nh, which is an adjustment number 224, here defining an upper end, of an adjustment interval 226.

In this particular embodiment, adjusting 220 is a step of splitting 228 the cell 212.

This is equivalent to splitting 228 of the basis functions 202 and corresponding coefficients 202 that represent more than a predetermined number of plots 222.

Likewise the optional step of removing 240 of old plots 15 will have a step of adjusting 202 that includes merging 242 cells or joining 242 basis functions 202.

Figure 4:
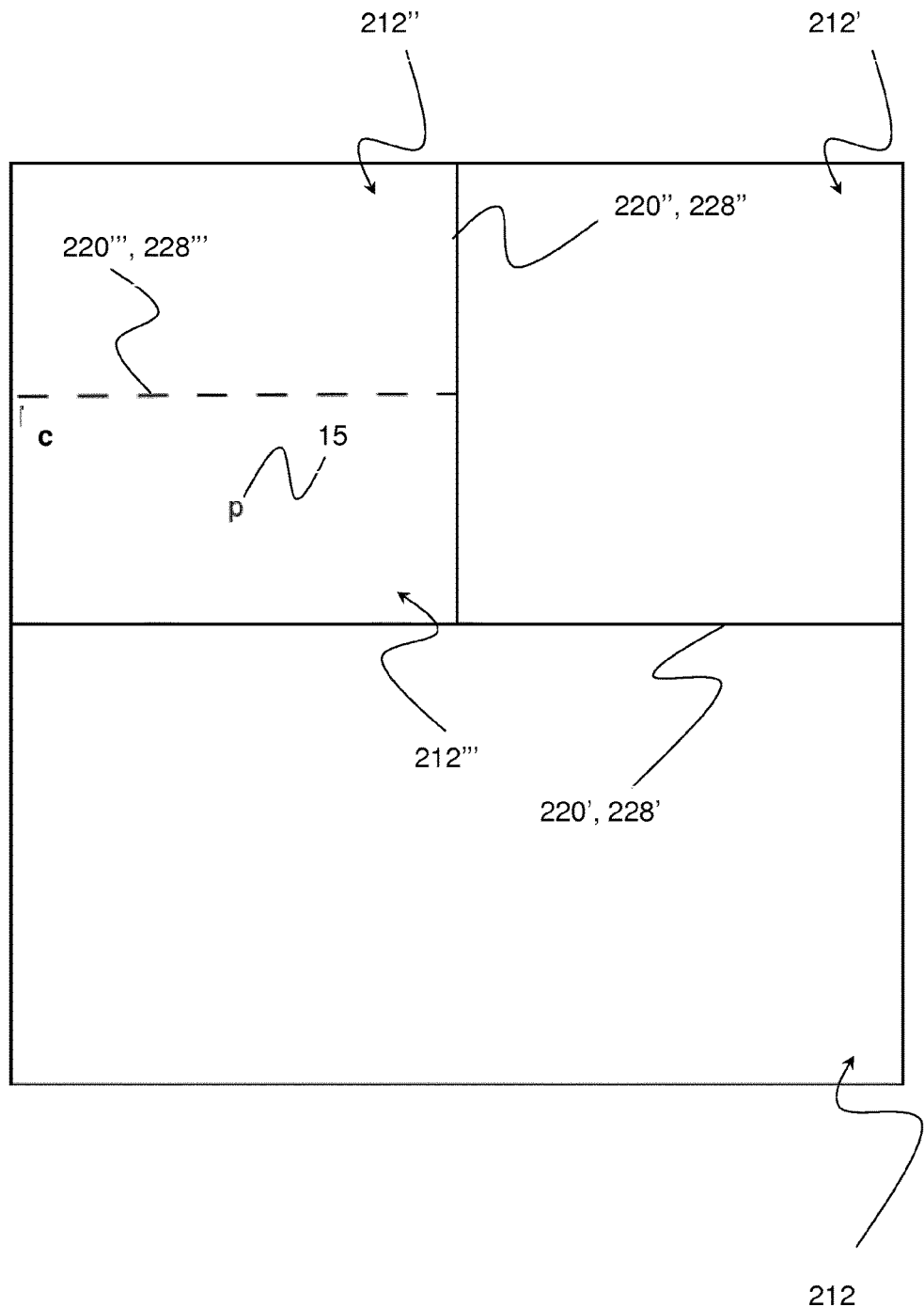
FIG. 4 illustrates an addition of a plot to a cell.

FIG. 4 graphically illustrates an addition of a plot 15 to cell 212, c, that has been obtained by a series of splittings 228', 228" and potential splitting 228'" of a basis functions 202 being a cell 212, c enclosing a plot p, 15.

The cell 212'", c, enclosing the plot 15, p, is found by starting with the top (in a hierarchy) most cell 212. If that cell 228 is split 228', then the next cell 212' is tried; if that next cell 212' is also, split 228", then the process continues until the cell 212'" is reached.

At all times: a record is kept of which plots 15, . . . are in which cell 212 and the number of plots 222 in each cell 212'".

It is understood that the adjusting 220 or splitting 228 is limited by some minimum size for each dimension 206 at which minimum size the adjusting 220 or splitting 228 is terminated. A natural minimum size is the sensor resolution or a minimum size directly derived thereof.

FIGS. 5 to 8 illustrate alternative ways of adjusting 220 where the adjusting 220 is splitting 228 of a 2-dimensional 206 normalised basis 202 that is normalised i.e. in a ($z_1$, $z_2$)-coordinate system 110', 110' representing the measurement space 110. For illustrative purposes the same plots 15 are distributed in the measurement space 110 in the figures.

Adjusting 220 is performed at an adjusting position 301 determined by a metric 300.

In some embodiments, the splitting 228 is performed cyclic in the M dimensions 206. In this embodiment that is alternating between the $z_1$-axis and the $z_2$-axis.

Figure 5:
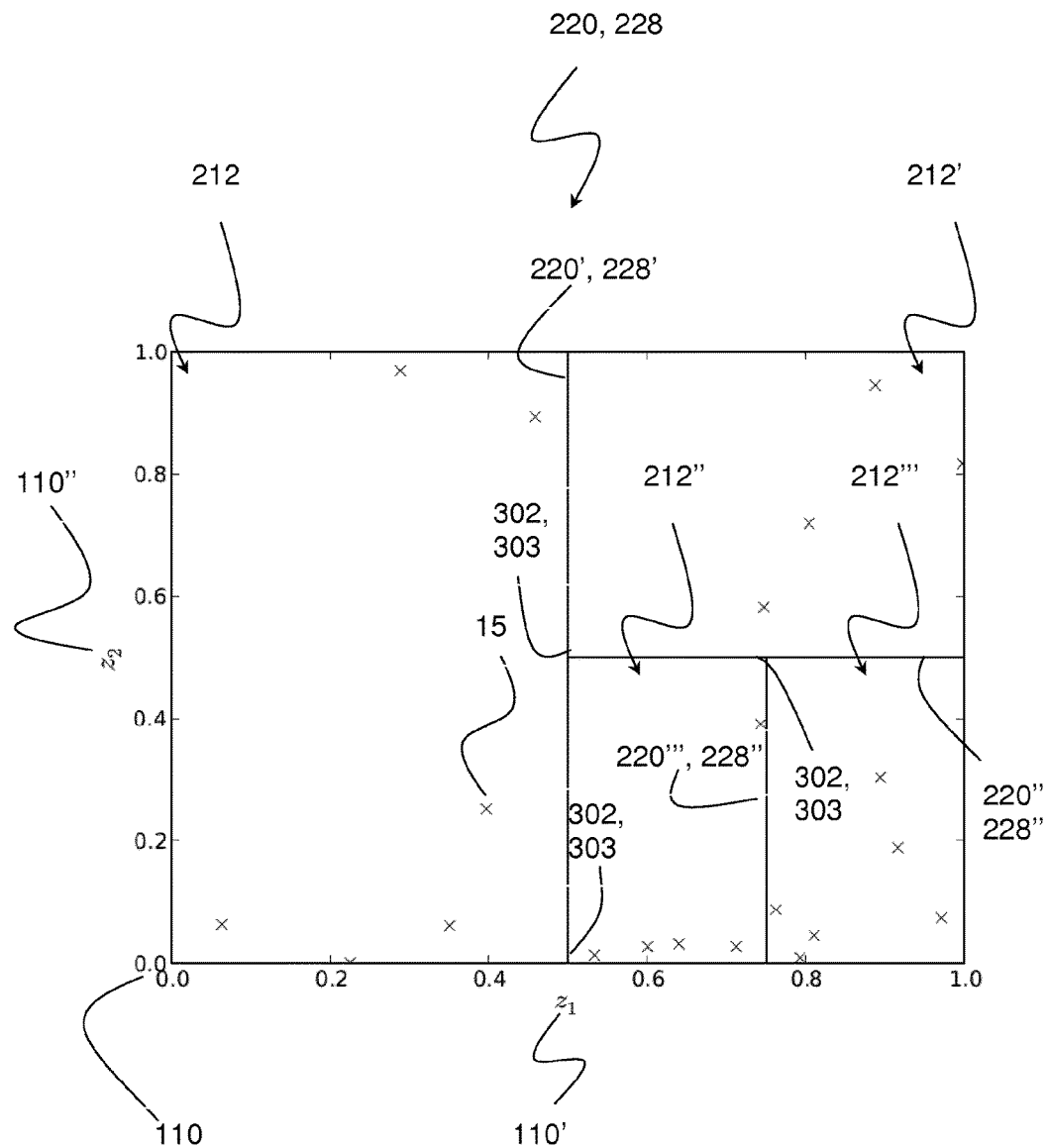
FIG. 5 illustrates an adjustment based on a centre metric.

FIG. 5 illustrates a metric 300 of splitting 228 based on dividing each cell 212 using a centre metric 302 that defines a centre position 303 on the measurement dimensions 110' 110" in a cyclic way or here alternating way. That is dividing each cell 212 in half.

The splittings 228', 228", 228'" result in the cells 212, 212', 212", 212'" each having a number of plots 222 that is in the adjusting interval 226.

Figure 6:
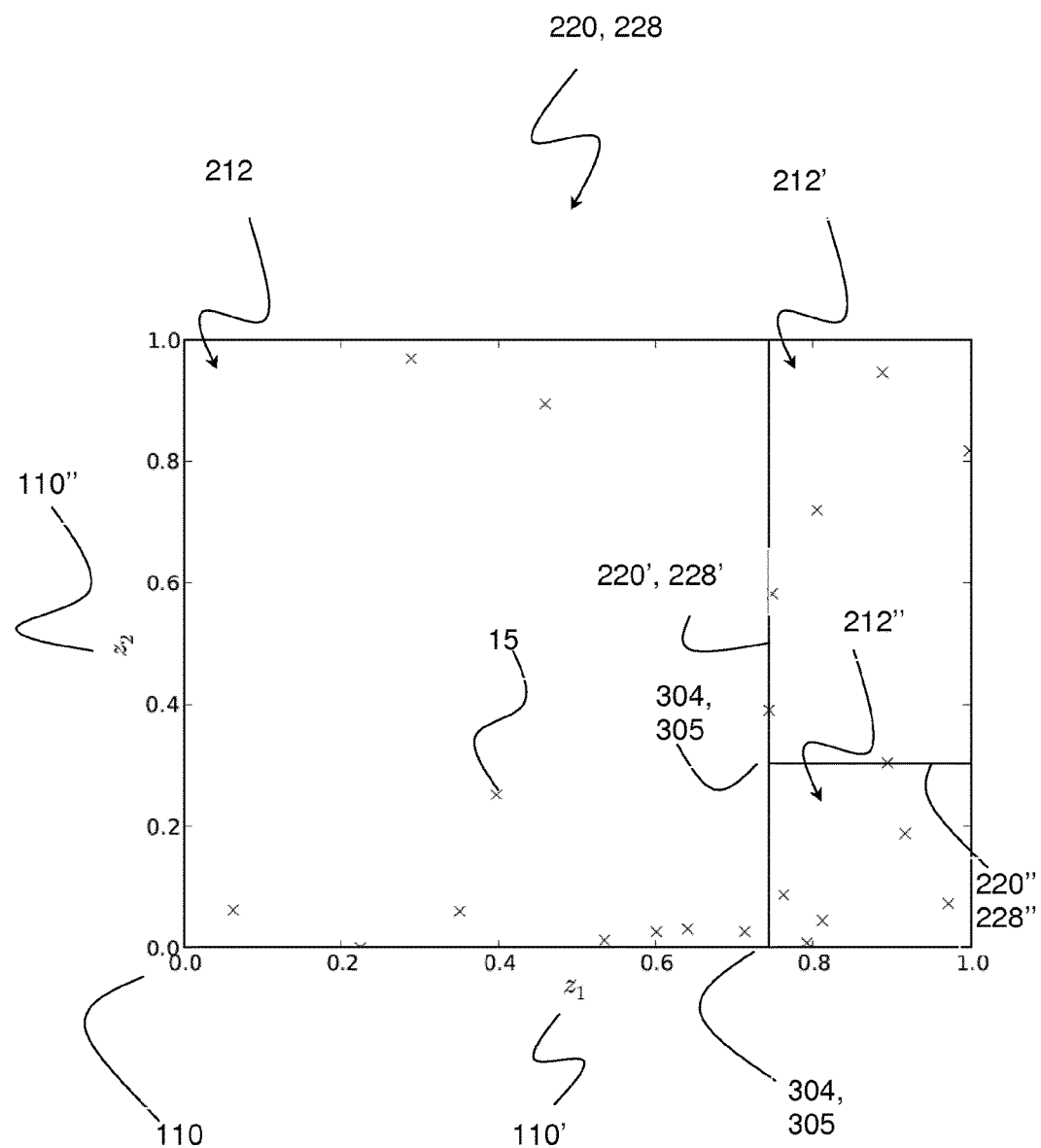
FIG. 6 illustrates an adjustment based on an average metric.

FIG. 6 illustrates a splitting 228 based on an average metric 304 that defines an average position 305 on the bases 202', 202". The splittings 228', 228" result in three cells 212, 212', 212" each having a number of plots 222 that is in the adjusting interval 226.

Figure 7:
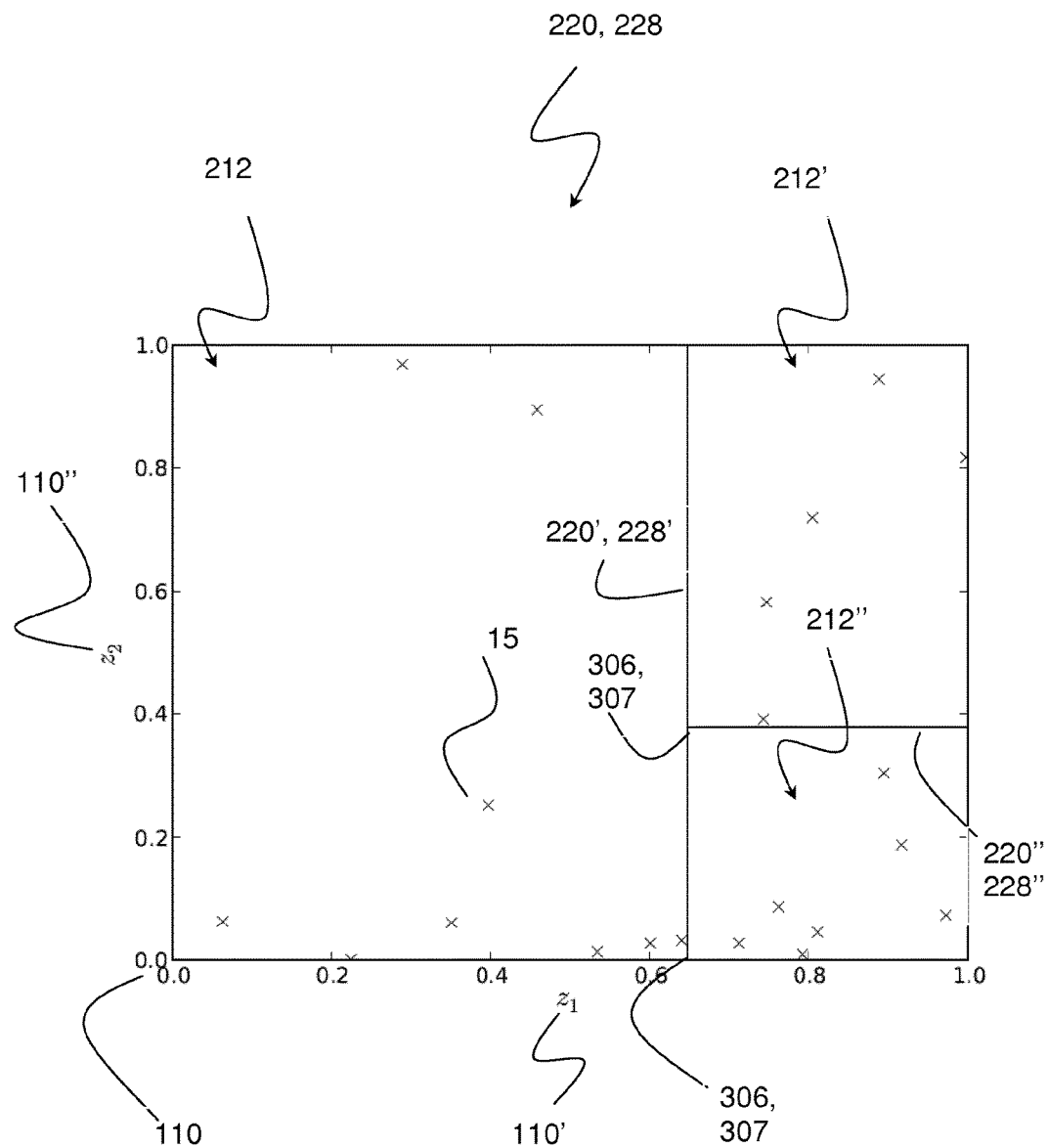
FIG. 7 illustrates an adjustment based on a median metric.

FIG. 7 illustrates, very similar to the average metric 304, a splitting 228 based on a median metric 306 that defines a median position 307 on the bases 202', 202". The splittings 228', 228" result in three cells 212, 212', 212" each having a number of plots 222 that is in the adjusting interval 226.

Figure 8:
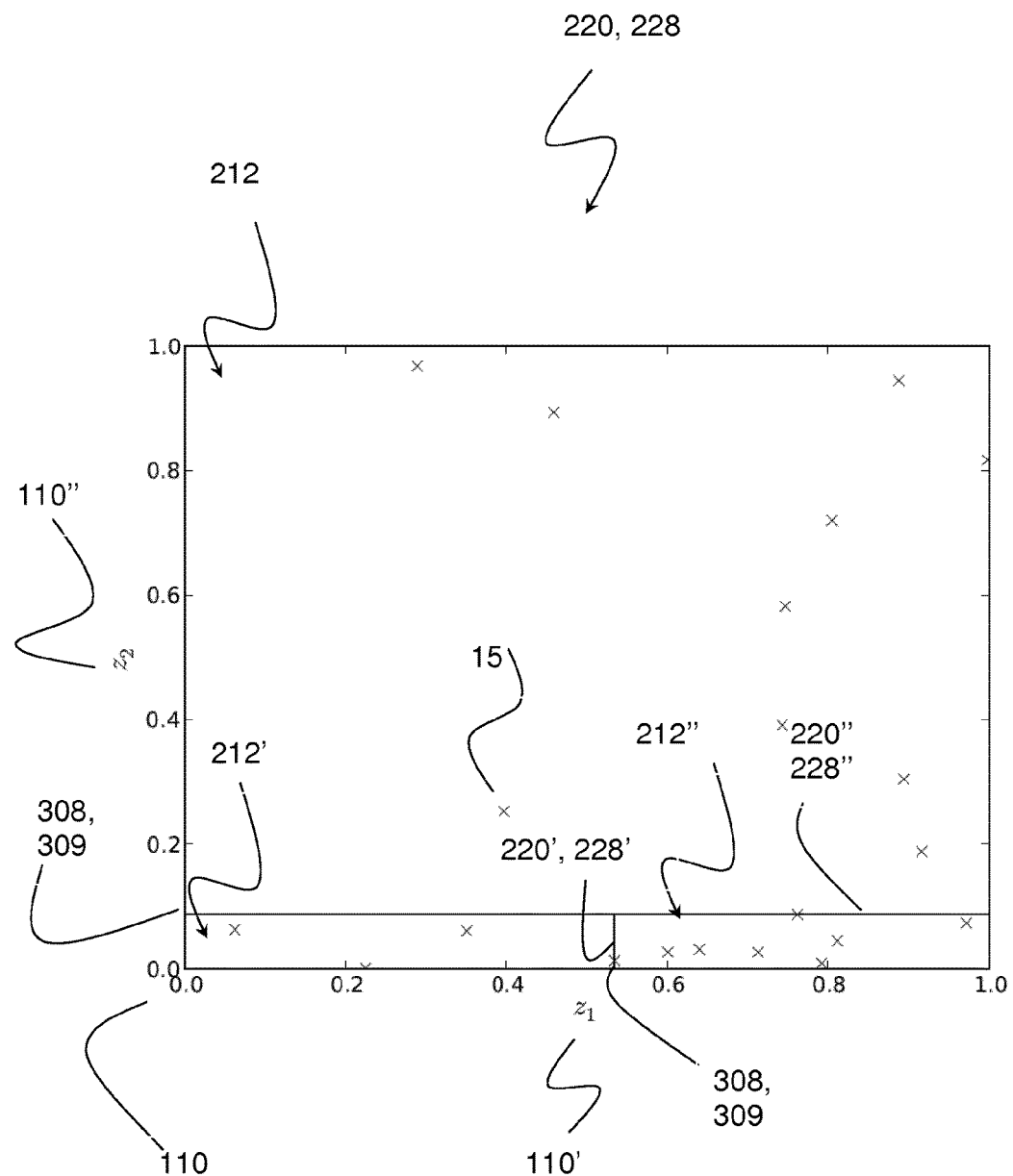
FIG. 8 illustrates an adjustment based on likelihood metric.

FIG. 8 illustrates a splitting 228 based on a likelihood metric 308, in particular a maximum likelihood metric that defines a likelihood position 309 on the bases 202', 202". The splittings 228' 228" result in three cells 212, 212', 212" each having a number of plots 222 that is in the adjusting interval 226.

Figure 9:
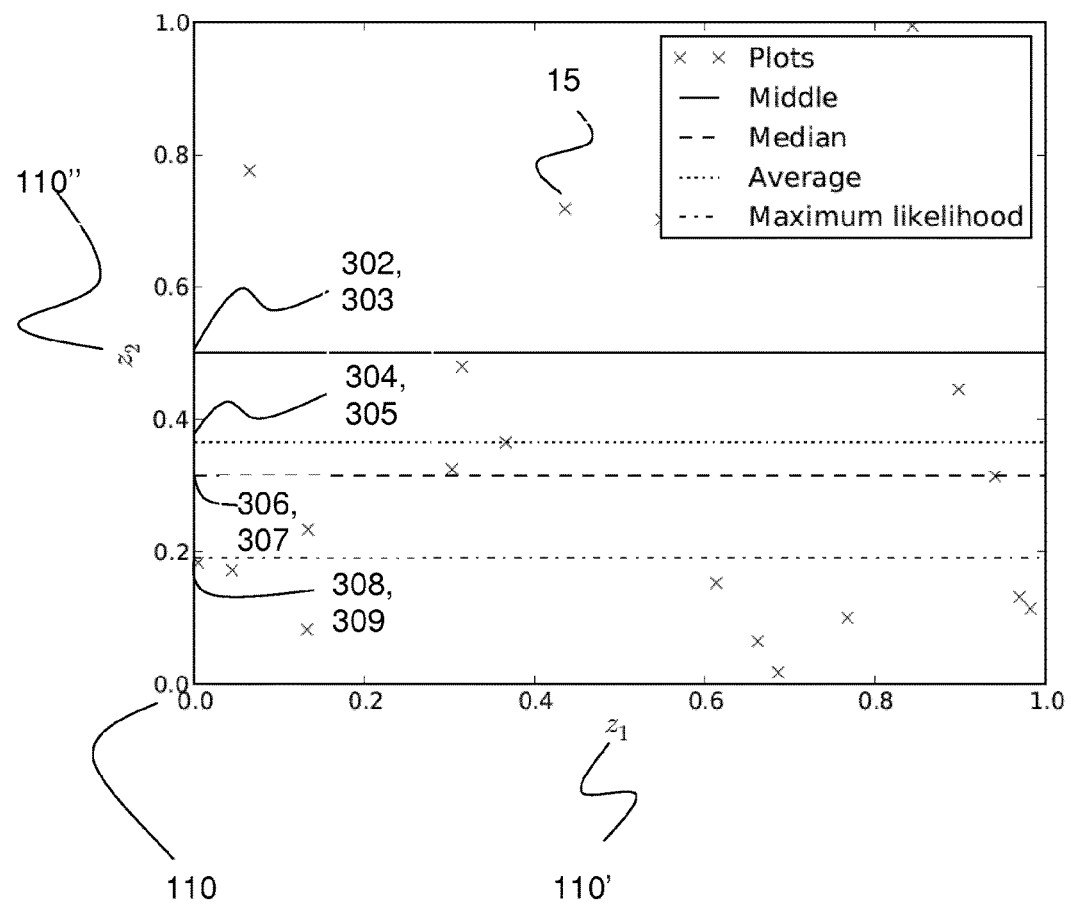
FIG. 9 illustrates the differences adjusting or splitting using different metrics for a particular distribution of plots in a space.

FIG. 9 summarises the different partitions of the space 110 populated by a number of plots 15 by splitting the $z_2$-axis 202" using different metrics 300 as outlined.

Figure 10:
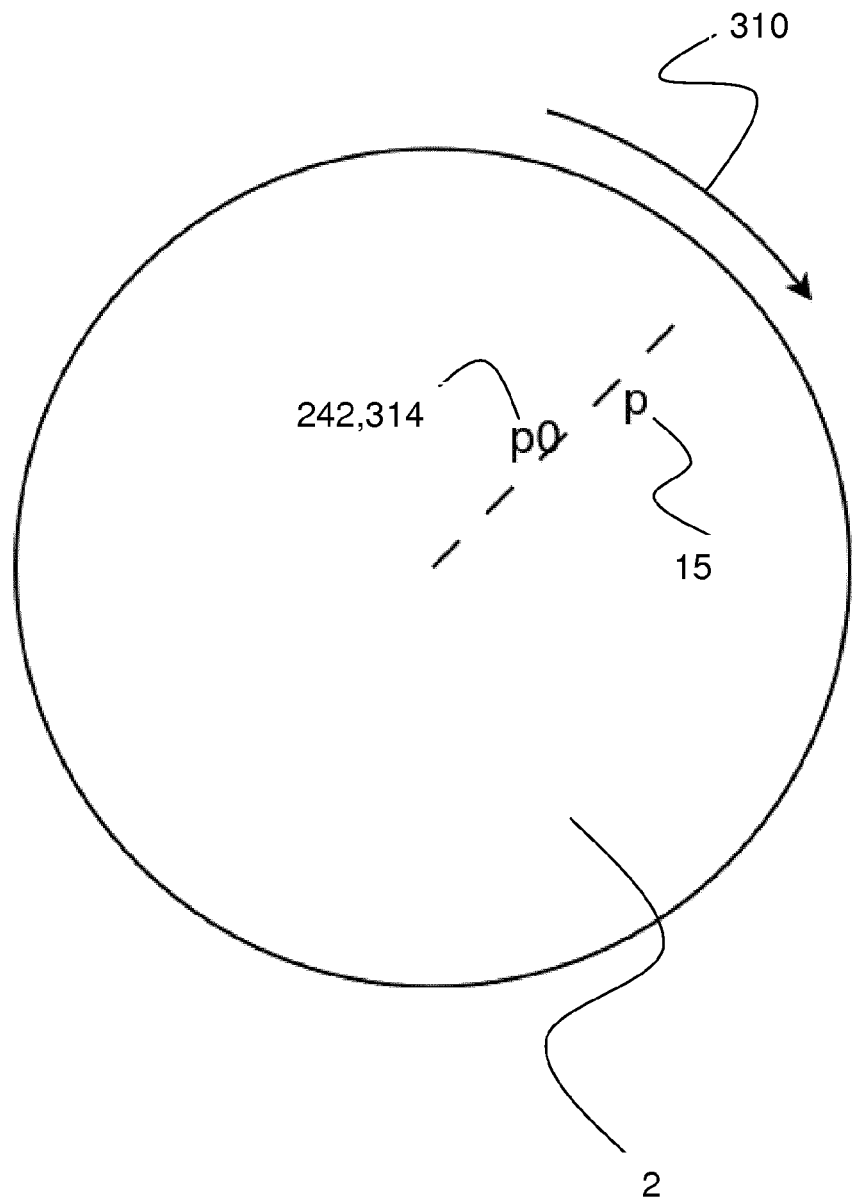
FIG. 10 shows a rotating radar system generating new plots and removing old plots.

FIG. 10 Illustrates how a rotating antenna in radar system 1 configured for a 360-degrees rotation, scans 310 an observation volume 2 and detects and generates new plots 15, p, that are $S(p,p_o) > N$ scans newer.

Removing of old plots 242 happens as the sensor sweeps by again.

In the rotating radar implementation illustrated, $S(p, p_o)$ is calculated as the total amount the radar antenna has rotated from one plot 15 to the other calculated in radians divided by $2\pi$.

For a non-rotating radar, the number of frames, or simply the time difference between the plots divided by a typical revisiting time, can be used.

Figure 11:
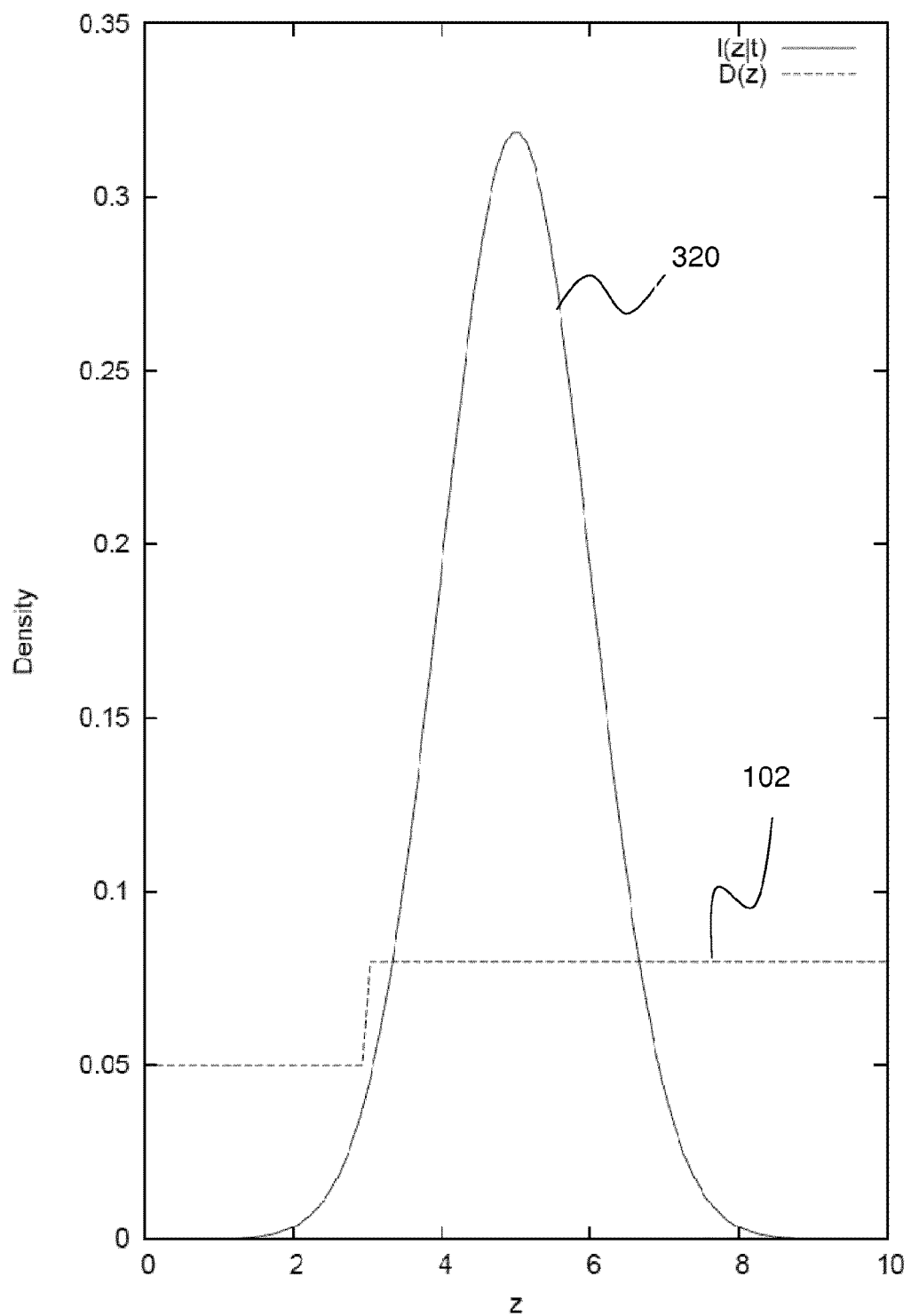
FIG. 11 shows a prediction of a target from a tracker.

FIG. 11 shows a prediction 320 output from a tracker 22. The prediction 320 l(z|t) reflects the likelihood density of the target to generate a plot from the radar having the attributes z 104. That is—equivalently—the likelihood l(z|t) 320 for a target 4, t, to generate a plot 15 from the plot extractor 14 having the attributes 104, z, in the measurement space 110

For each plot 15, p, the unit less likelihood ratio 322 between the target likelihood 320 and the plot density 102 $l(z_p|t)/D(z_p)$ is important and used as an association likelihood, which tells the tracker 22 how likely this particular plot is representing the specific target 4, t.

Figure 12:
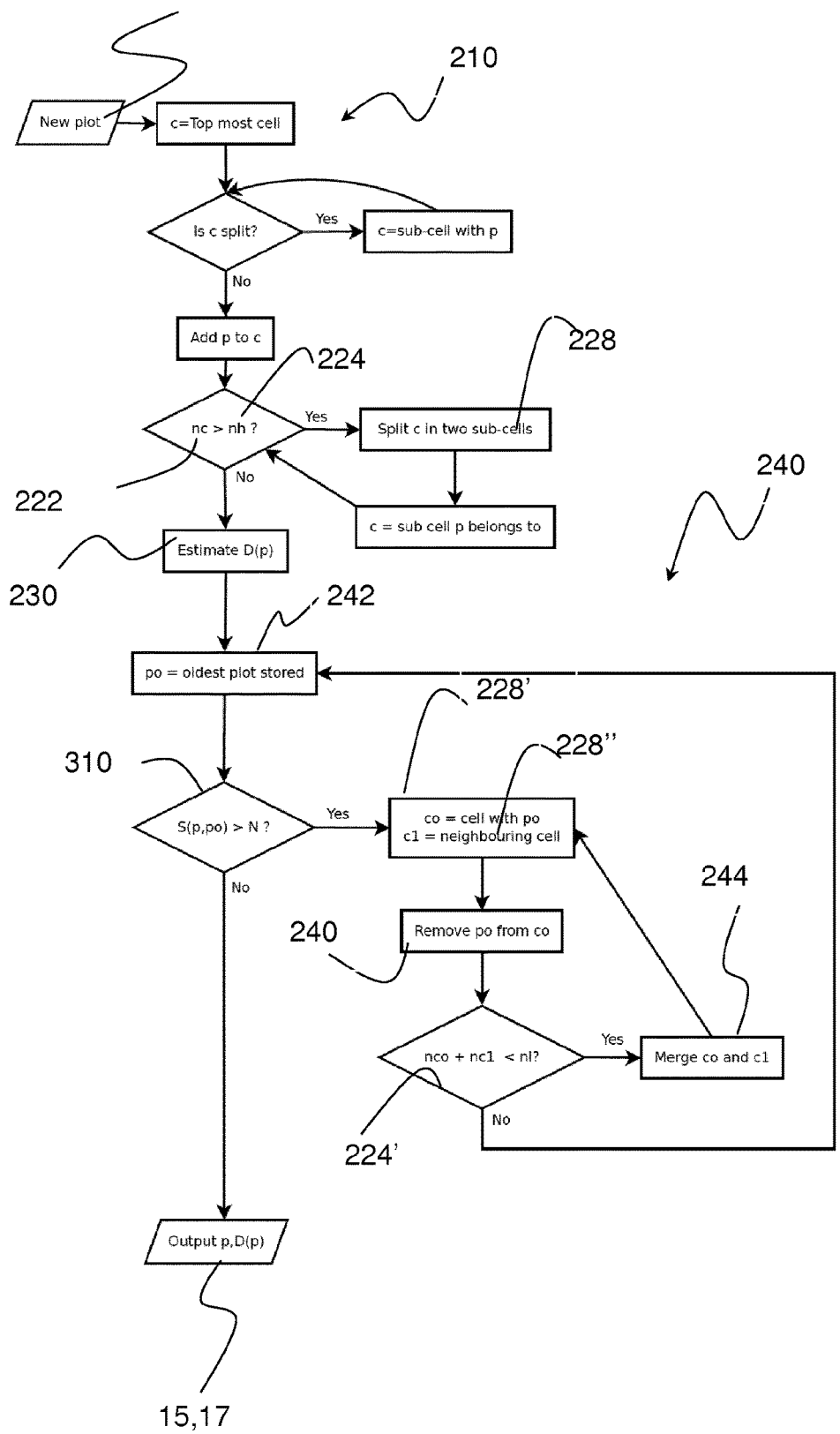
FIG. 12 show a schematic overview of a method of estimating plot density integrating adding and removing plots.

FIG. 12 shows a method 100 of estimating a local plot density 17 in a plot density estimator 16 in a radar system 1. The top part of the flow diagram is essentially a variation of the flow diagram illustrated in FIG. 2.

Further, the illustrated embodiment takes into account removing 240 of plots 15, and in this case, removal of the oldest points 242.

If the number of plots 15, i.e. $S(p,p_0)$, is large enough 330 and there is an old plot, $p_0$, 242, then a cell 228' enclosing a plot, p, 15 and a neighbouring cell 228" identified before the old plot, $p_0$, 242 is removed 240 form the cell 228'. If the number of plots 222 is less than the adjusting number 224', then the two cells 228', 228" are merged 244.

It is noticed that there is an upper adjustment number 224 and a lower adjustment number 224' determining a split or a merger. Those numbers or values are in an adjustment interval 226.

Thereby this embodiment outlines a fully adaptive method for estimating plot density 17 continuously as new plots 15 arrive and plots become obsolete and are disregarded as old plots 242 or diminishing value due to fading weights.

Figure 13:
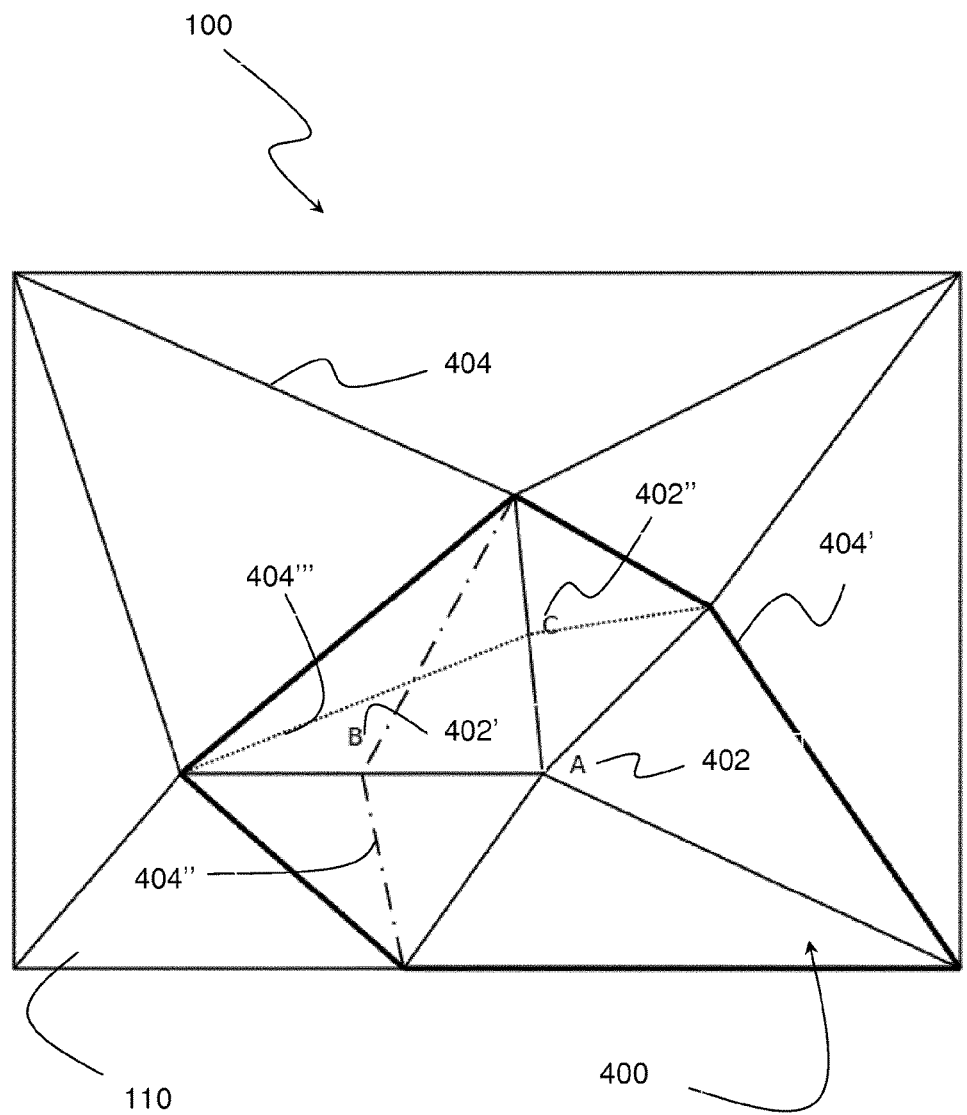
FIG. 13 shows an alternative partition of measurement space using finite element functions.

FIG. 13 shows an alternative method 100 using finite elements functions 400.

This is done by establishing a set of mesh points 402 in the measurement space and create boundaries 404 and standard finite element basis functions 400. When a plot 15 arrives or is removed, updating, adjusting or changing the relevant coefficients 204 can be done as disclosed.

For example, when a coefficient 204, ai, becomes larger than an adjusting number 224, $n_h$, then introduce a new mesh point 402' and new boundaries. Insert the mesh point 402 and choose the boundaries 404 such that the likelihood $$\log L = -\Sigma_i a_i + \Sigma p \, \log(\Sigma I a_i e_i(z_p)) \qquad [7]$$

is maximized.

The figure illustrates a two-dimensional measurement space 110. The measurement space 110 is split by boundaries 404 running between mesh points 402.

Around mesh point A, a basis function 202 which is 0 at the bold boundaries 404' defines a cell. New mesh points B 402' or C 402" and new dash-dotted 404" or dotted boundaries 404'" can be introduced when there is too many plots 15 close to the mesh point A 402.

What is claimed is:

1. A method of improving a radar system including an antenna, the method comprising
    transmitting a first signal configured to scan an observation volume;
    receiving a second signal responsive to interaction of the transmitted first signal with objects in the observation volume;
    generating plots with plot attributes based on the received second signal;
        establishing a non-empty set of M-dimensional basis functions and corresponding coefficients in an M-dimensional measurement space, the non-empty set of M-dimensional basis functions and corresponding coefficients representing a local plot density, wherein M corresponds to a number of plot attributes, the corresponding coefficients corresponding to a number of plots represented by the basis functions;
    hereinafter repeatedly:
        updating at least one coefficient based on at least one plot as obtained from the radar system;
        adjusting the basis functions and the corresponding coefficients to represent the number of plots in a predetermined adjusting interval; and
        estimating a local plot density; and
    outputting a representation of the observation volume based on the estimated local plot density.

2. The method according to claim 1, wherein adjusting the basis functions and corresponding coefficients comprises partitioning the measurement space so as to obtain or maintain a certain number of plots or stay within a predetermined adjusting interval of plots in each partition.

3. The method according to claim 1, wherein adjusting the basis functions and corresponding coefficients comprises a step of splitting the basis functions and modifying corresponding coefficients.

4. The method according to claim 1, wherein adjusting the basis functions and corresponding coefficients comprises a step of updating at least one coefficient when a plot is removed.

5. The method according to claim 1, wherein adjusting the basis functions and corresponding coefficients comprises a step of joining basis functions and modifying the corresponding coefficients.

6. The method according to claim 1, wherein the basis functions are normalized.

7. The method according to claim 1, wherein the measurement space at least comprises one measure of intensity of an echo from the radar system.

8. The method according to claim 1, wherein the method further includes at least one step of adjusting the basis functions and corresponding coefficients based on a feedback of a track.

9. The method according to claim 1, wherein the method comprises a further step of removing old plots.

10. The method according to claim 1, wherein the method further comprises at least one step of fading memory where the corresponding coefficients are derived from a weighted combination of plots with a weight that decays over time.

11. The method according to claim 10, wherein the weight decays exponentially or reciprocally.

12. The method according to claim 11, wherein the exponential decay is according to $\exp(-S(p,p1)/S_0)$.

13. The method according to claim 11, wherein the reciprocal decay is according to $1/S(p,p_0)$ or $1/(S_0(1-S(p,p_0)/S_0)$.

14. The method according to claim 1, wherein at least a sub-dimension of the basis functions is a cell with a finite value inside the cell and 0 (zero) outside.

15. The method according to claim 14, wherein adjusting the cells and corresponding coefficients is performed by any of the following steps:
adjusting cells and corresponding coefficients by cyclically alternating dimensions in which the cells are to be adjusted;
adjusting cells and corresponding coefficients in the dimension yielding an average plot position that is most distant from a center position;
adjusting cells and corresponding coefficients in the dimension yielding an median plot position that is most distant from a center position; and
adjusting cells and corresponding coefficients in the dimension yielding a plot maximum likelihood; or any combination thereof.

16. The method according to claim 15, wherein adjusting of the cell and corresponding coefficients in a dimension is performed at a position determined by any of the following metrics on at least one cell where the position where each cell is adjusted is given by:
a metric determining the center position;
a metric determining the average plot position;
a metric determining the median plot position;
a metric determining the plot maximum likelihood position;
and any combination thereof.

17. The method according to claim 14, wherein the finite value inside the cell is $1/V_c$, where $V_c$ is a volume of the cell.

18. The method according to claim 1, wherein the plot attributes comprises one or more of the following attributes: plot intensity, radial velocity, Doppler velocity, range, bearing and position.

19. An improved radar system comprising:
a transceiver configured to transmit a first signal configured to scan an observation volume and receive a second signal responsive to interaction of the transmitted first signal with objects in the observation volume;
one or more hardware processors configured to:
generate plots with plot attributes based on the received second signal;
establish a non-empty set of M-dimensional basis functions and corresponding coefficients in an M-dimensional measurement space, the non-empty set of M-dimensional basis functions and corresponding coefficients representing a local plot density, wherein M corresponds to a number of plot attributes, the corresponding coefficients corresponding to a number of plots represented by the basis functions;
hereinafter repeatedly:
update at least one coefficient based on at least one plot as obtained from the radar system;
adjust the basis functions and the corresponding coefficients to represent the number of plots in a predetermined adjusting interval; and
estimate a local plot density; and
a display configured to output a representation of the observation volume based on the estimated local plot density.

* * * * *

UNITED STATES PATENT AND TRADEMARK OFFICE
CERTIFICATE OF CORRECTION

PATENT NO. : 9,864,051 B2
APPLICATION NO. : 14/441156
DATED : January 9, 2018
INVENTOR(S) : Esben Nielsen Page 1 of 1

It is certified that error appears in the above-identified patent and that said Letters Patent is hereby corrected as shown below:

On the Title Page

Item (73), Assignee at Line 11, Change "DE" to --DK--.

Signed and Sealed this
Fourth Day of June, 2019

Andrei Iancu
*Director of the United States Patent and Trademark Office*